(12) United States Patent
Kornmayer et al.

(10) Patent No.: US 6,437,773 B1
(45) Date of Patent: Aug. 20, 2002

(54) NOTEBOOK COMPUTER

(75) Inventors: Ingbert Kornmayer, Augsburg; Bernd Seidel, Auerbach; August Scherer, Dinkelscherben; Jürgen Geiger, Lagerlechfeld; Christoph Mayer, Augsburg, all of (DE)

(73) Assignee: Fujitsu Siemens Computers GmbH, Munich (DE)

( * ) Notice: Subject to any disclaimer, the term of this patent is extended or adjusted under 35 U.S.C. 154(b) by 0 days.

(21) Appl. No.: 09/665,248

(22) Filed: Sep. 18, 2000

Related U.S. Application Data

(63) Continuation of application No. PCT/DE99/00716, filed on Mar. 15, 1999.

(30) Foreign Application Priority Data

Mar. 18, 1998 (DE) ........................................ 198 11 871

(51) Int. Cl.[7] ................................................ G09G 5/00
(52) U.S. Cl. ...................................... 345/169; 345/901
(58) Field of Search ................................ 345/168, 169, 345/172, 173, 156, 901; 341/21, 22, 23; 361/680, 681; 439/492, 493, 495, 496, 74, 76

(56) References Cited

U.S. PATENT DOCUMENTS

| | | | | |
|---|---|---|---|---|
| 4,890,381 A | * | 1/1990 | Dubois et al. | 439/493 |
| 5,066,235 A | * | 11/1991 | Kobayashi | 439/76 |
| 5,400,055 A | * | 3/1995 | Ma et al. | 345/168 |
| 5,576,929 A | * | 11/1996 | Uchiyama et al. | 361/680 |

* cited by examiner

Primary Examiner—Chanh Nguyen
(74) Attorney, Agent, or Firm—Laurence A. Greenberg; Werner H. Stemer; Gregory L. Mayback

(57) ABSTRACT

A notebook computer has a basic body comprising a bottom shell and a top shell. A display unit is arranged in a pivotable lid housing and a keyboard is detachably mounted on the top shell. A cutout is provided in the top shell and an outwardly directed electrical contact configuration is secured on an assembly that is attached to the basic body such that the contact configuration is secured in the cutout. The contact configuration is for electrically contacting the keyboard, which has a corresponding mating contact configuration.

5 Claims, 4 Drawing Sheets

NOTEBOOK COMPUTER

CROSS-REFERENCE TO RELATED APPLICATION

This is a continuation of copending international application PCT/DE99/00716, filed Mar. 15, 1999, which designated the United States.

BACKGROUND OF THE INVENTION

Field of the Invention

The invention relates to a notebook computer having a detachable keyboard.

In notebook computers, the usually slight housing dimensions and the associated crowded design mean that particularly high demands are placed on the construction of the housing, particularly also in relation to ease of maintenance. On the one hand, the housing should be easily accessible from all sides; on the other hand, this is made considerably more difficult by the keyboard which is provided on the top of the basic housing of the computer.

U.S. Pat. No. 5,400,055 A discloses a notebook computer in which the keyboard is embedded in a frame-like cutout in the top surface of the upper part of the housing and can be connected to the computer unit's system board by means of a plug connector provided on the underside of the keyboard. This known notebook computer's relatively large cutout, covered by the keyboard, in the top surface of the housing means that the computer permits very easy access to the circuit components arranged below the top surface of the housing, but it is also operable only when the keyboard is plugged in and embedded in the cutout.

To simplify working with notebook computers, the keyboards are increasingly designed as an independent unit which, as required, can be separated from the housing and operated at a distance from the notebook computer's display unit which is beneficial from an ergonomic viewpoint. Cables or plugs can be used on the front, and possibly an infrared interface can also be used. However, this requires a housing design which has a largely closed top surface so that the housing still remains sufficiently closed even when the keyboard is removed, particularly also with regard to observing EMC provisions. However, such a design is again unfavorable for ease of maintenance if the plug device provided for keyboard connection on the top surface of the computer housing is permanently connected to the housing and the housing is to be opened via the top side.

SUMMARY OF THE INVENTION

It is accordingly an object of the invention to provide an electrical coupling for a keyboard, which is detachably mounted on a largely closed top surface of a notebook computer housing, such that the ease of maintenance of the housing is impaired as little as possible.

With the foregoing and other objects in view there is provided, in accordance with the invention, a notebook computer, that includes a basic housing with a bottom shell, and a top shell having a top surface with a cutout. The basic housing includes an assembly securing an outwardly directed multi-pole electrical contact configuration within the cutout. A lid housing has an inside surface with a display unit configured thereon. The lid housing is pivotably mounted to the basic housing. A keyboard is detachably mounted to the top shell of the basic housing and has an electrical contact configuration for mating with the electrical contact configuration of the basic housing. The top surface of the top shell substantially closes the top shell.

In accordance with an added feature of the invention, the electrical contact configuration of the basic housing includes a plurality of strip-shaped contact springs that are configured in parallel and serve as a support for the electrical contact configuration of the keyboard.

In accordance with an additional feature of the invention, at least one of the plurality of strip-shaped contact springs includes an end that is clamped.

In accordance with another feature of the invention, the plurality of strip-shaped contact springs are angled in the manner of a roof, and include free ends resiliently supported on a base support.

In accordance with a further feature of the invention, the electrical contact configuration includes a side provided with an additional electrical contact element for connection to a ground potential and for resiliently bearing against an inside surface of the top shell when it is closed.

Other features which are considered as characteristic for the invention are set forth in the appended claims.

Although the invention is illustrated and described herein as embodied in a notebook computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
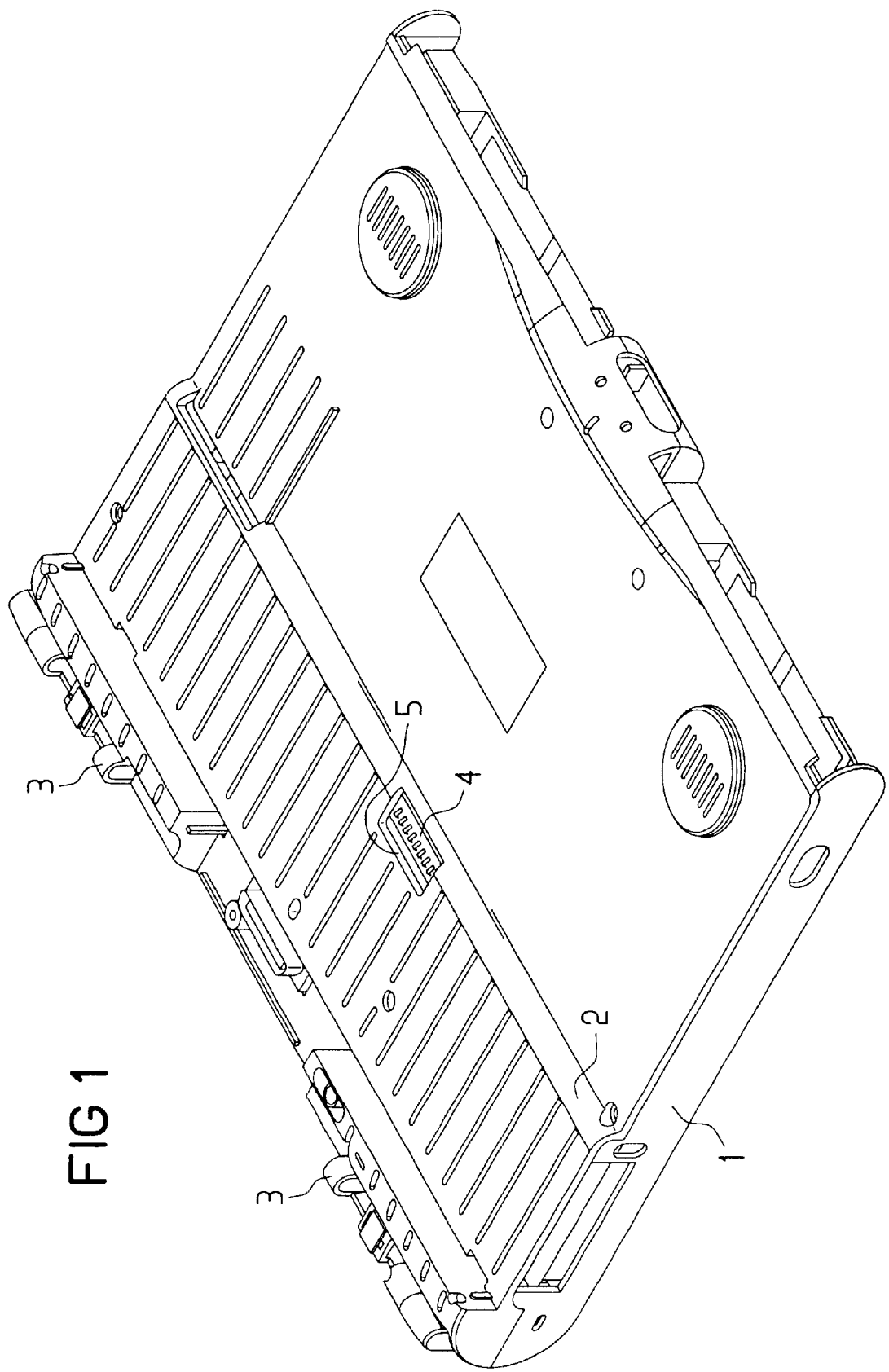
FIG. 1 shows a notebook computer housing in the closed state with a removable keyboard (not shown)

Referring to the figures of the drawing in detail and first, particularly, to FIG. 1 thereof, there is shown a notebook computer housing which comprises a bottom shell 1 and a top shell 2 and on whose top surface a keyboard (not shown in the figure) can be detachably mounted. The top shell 2 of the housing is mounted on the bottom shell 1 so that it can pivot at the rear longitudinal edge. Additionally provided along this rear edge is a hinge 3 on which a flat screen (not shown in the figure) which is likewise detachable from the housing is mounted so that it can pivot. The flat screen is located in a lid housing which, in the closed state, rests on the keyboard. For the electrical coupling of the keyboard, the top surface of the top shell 2 is provided with an outwardly directed multipole contact arrangement 4 which is arranged inside a cutout 5 provided in the top surface 10 of the top shell 2. On its underside, the keyboard has a corresponding mating contact arrangement which rests on the contact arrangement 4 when the keyboard is mounted on the notebook.

Figure 2:
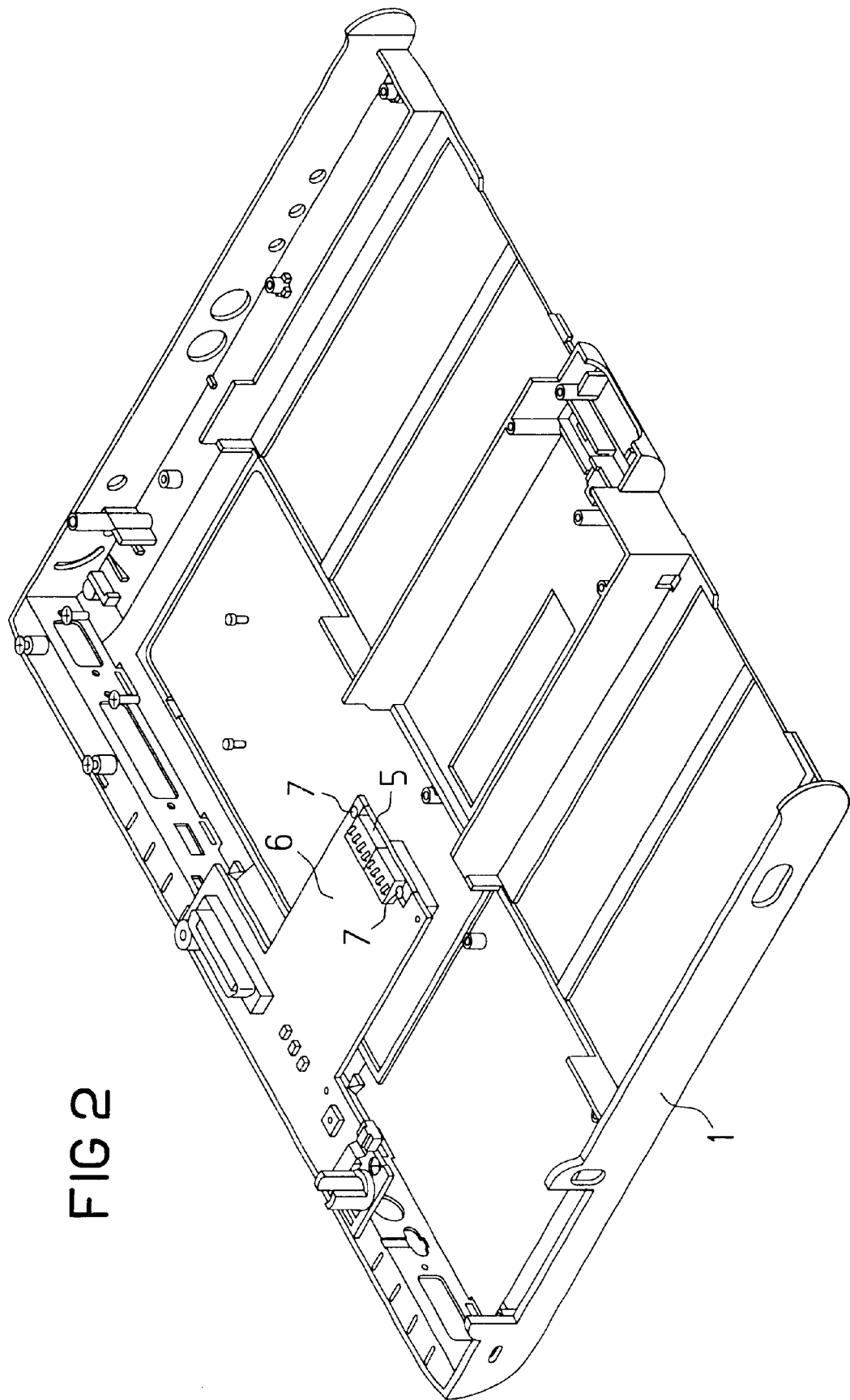
FIG. 2 shows the notebook computer housing shown in FIG. 1 in the opened state.

As FIG. 2 shows, the contact arrangement 4 is not mounted on the top shell 2, but rather on an assembly 6 inside the computer housing. This has the advantage that, if the computer housing needs to be opened, for example for maintenance purposes, the top shell 2 can easily be folded up independently of the contact arrangement 4.

The two sides 12 of the contact arrangement 4 are each provided with an additional contact element 7 which is at ground potential and bears resiliently against the inside of the top shell 2 when it is closed. In this way, an additional ground contact between the top shell 2 and the housing and the assemblies situated there is easily produced.

Figure 3:
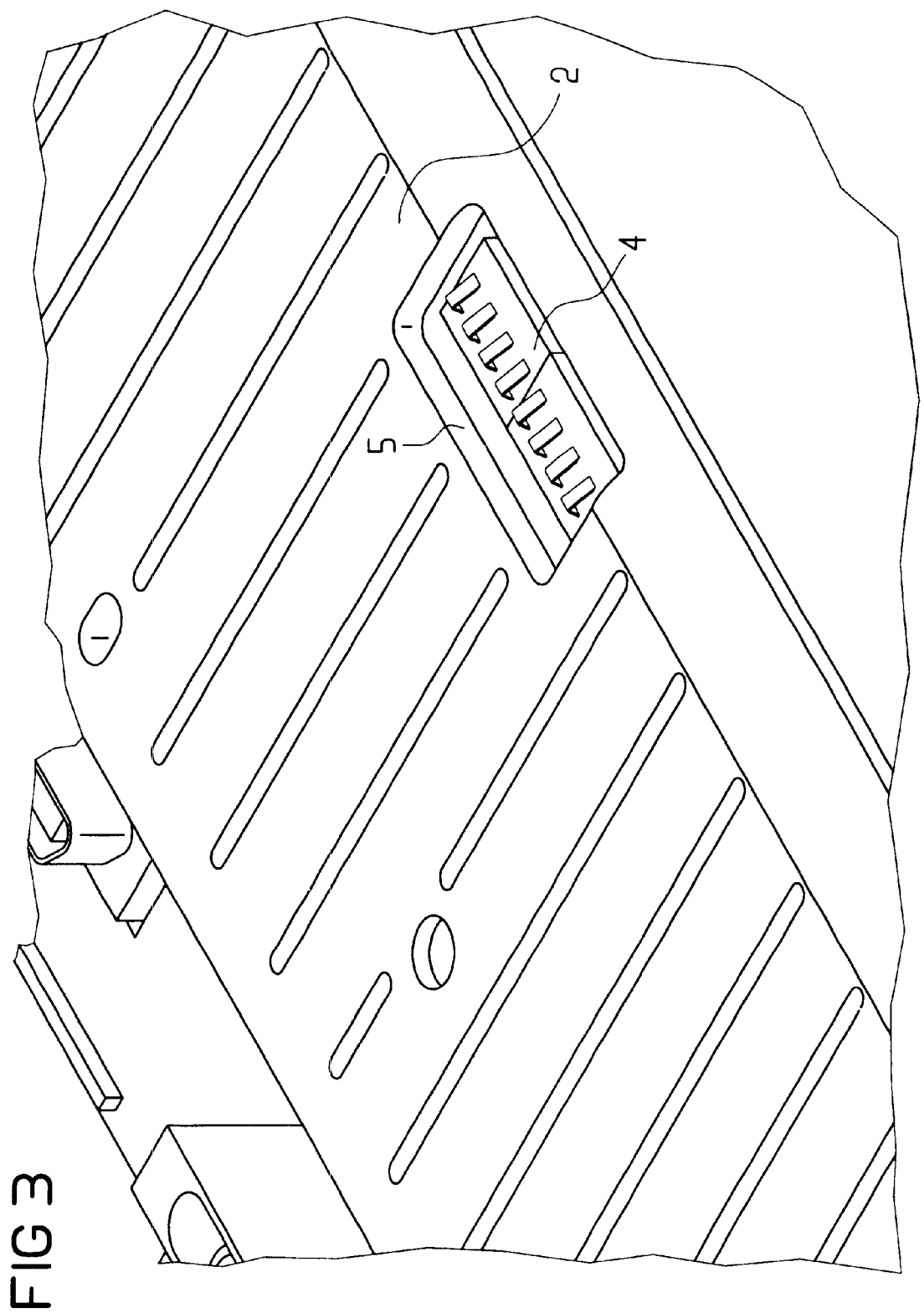
FIG. 3 shows an enlarged illustration of the contact arrangement in the notebook computer housing shown in FIGS. 1 and 2.

FIG. 3 shows the contact arrangement 4 embedded inside the cutout 5 in an enlarged detail of the top shell of the housing. This contact arrangement 4 comprises a plurality of strip-shaped contact springs 11 which are arranged in parallel, are clamped at one end and angled in the manner of a roof, and on which the keyboard's mating contact arrangement is resiliently supported.

Figure 4:
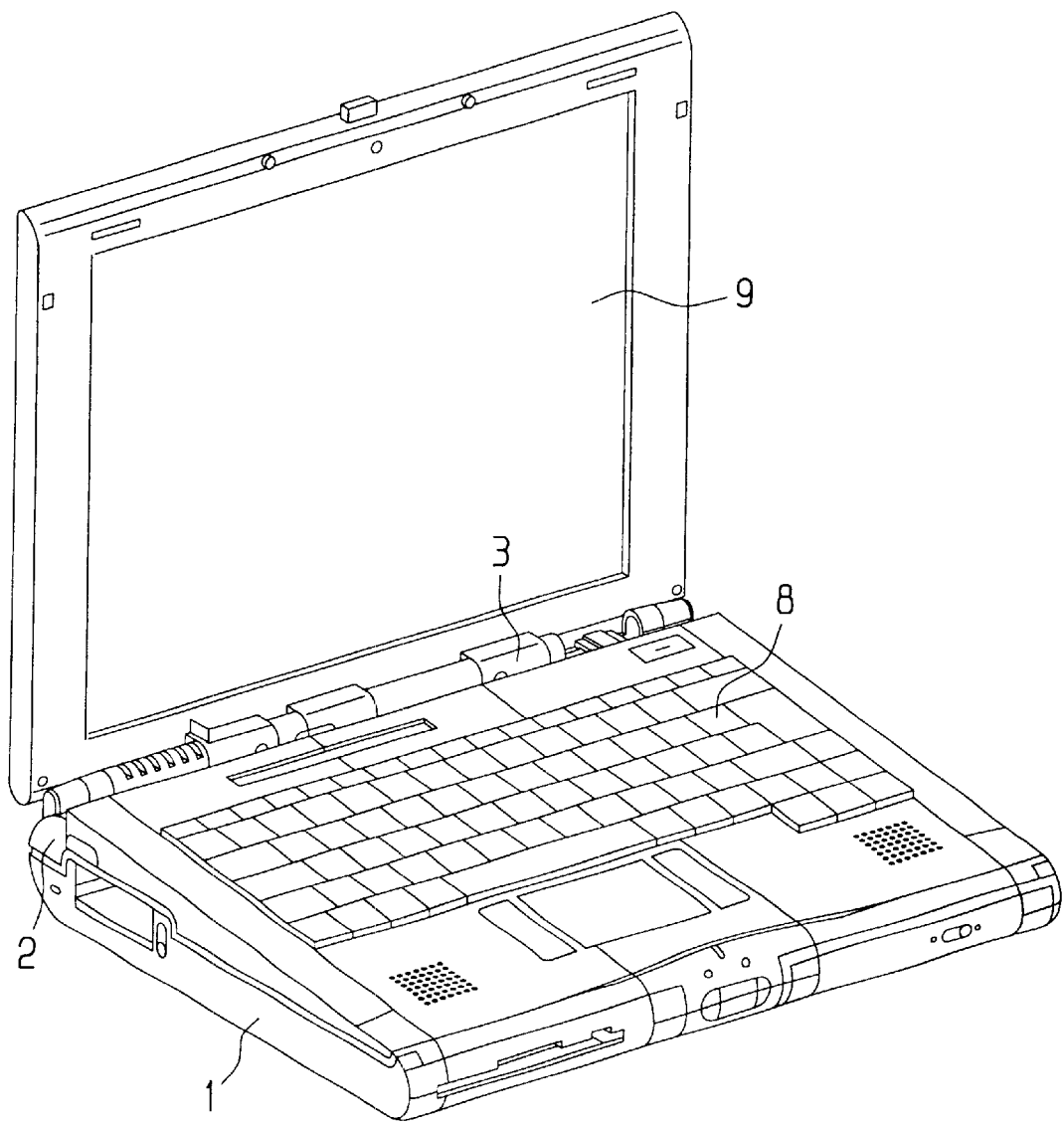
FIG. 4 shows the notebook computer housing shown in FIG. 1 with the keyboard mounted.

FIG. 4 shows the notebook computer housing with a keyboard 8 attached and a flat screen 9 mounted on the hinge 3 so that it can rotate.

We claim:

1. A notebook computer, comprising:
   a basic housing including a bottom shell, and a top shell having a top surface with a cutout, said basic housing including an assembly securing an outwardly directed multi-pole electrical contact configuration within said cutout;
   a lid housing having an inside surface with a display unit configured thereon, said lid housing pivotably mounted to said basic housing;
   a keyboard detachably mounted to said top shell of said basic housing and having an electrical contact configuration for mating with said electrical contact configuration of said basic housing; and
   a connection selected from the group consisting of a cable, an infrared interface and a wireless connection for electrically connecting said keyboard to the computer when said keyboard is not mounted in the computer;
   said top surface of said top shell substantially closing said top shell.

2. The notebook computer according to claim 1, wherein said electrical contact configuration of said basic housing includes a plurality of strip-shaped contact springs that are configured in parallel and serve as a support for said electrical contact configuration of said keyboard.

3. The notebook computer according to claim 2, wherein at least one of said plurality of strip-shaped contact springs includes an end that is clamped.

4. The notebook computer according to claim 3, wherein said plurality of strip-shaped contact springs are angled in the manner of a roof, and include free ends resiliently supported on a base support.

5. The notebook computer according to claim 1, wherein said electrical contact configuration includes a side provided with an additional electrical contact element for connection to a ground potential and for resiliently bearing against an inside surface of said top shell when it is closed.

* * * * *